(12) United States Patent
Bronicki

(10) Patent No.: US 6,247,312 B1
(45) Date of Patent: *Jun. 19, 2001

(54) METHOD OF AND APPARATUS FOR USING A GEOTHERMAL POWER PLANT

(75) Inventor: Lucien Y. Bronicki, Yavne (IL)

(73) Assignee: Ormat Industries Ltd., Yavne (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/057,437

(22) Filed: Apr. 9, 1998

Related U.S. Application Data

(63) Continuation of application No. 08/768,272, filed on Dec. 18, 1996, now Pat. No. 5,740,672, which is a continuation of application No. 08/000,551, filed on Jan. 4, 1993, now abandoned, which is a continuation of application No. 07/656,879, filed on Feb. 19, 1991, now abandoned.

(51) Int. Cl.[7] ........................................ F03G 7/00
(52) U.S. Cl. ........................ 60/641.2; 60/651; 60/671
(58) Field of Search ................................ 60/641.2, 652, 60/659, 651, 671; 180/65.1, 65.3, 68.3

(56) References Cited

U.S. PATENT DOCUMENTS

| | | | |
|---|---|---|---|
| 1,165,784 | * 12/1915 | Klingelsmith . | |
| 4,388,618 | * 6/1983 | Finger | 340/636 |
| 4,542,625 | * 9/1985 | Bronicki | 60/641.2 |
| 4,578,953 | 4/1986 | Krieger et al. | 60/655 |
| 4,700,543 | 10/1987 | Krieger et al. | 60/655 |
| 4,883,823 | * 11/1989 | Perry, Jr. et al. | 518/702 |
| 5,497,624 | * 3/1996 | Amir et al. | 60/641.5 |
| 5,531,073 | 7/1996 | Bronicki et al. | 60/641.2 |
| 5,740,672 | * 4/1998 | Bronicki | 60/641.2 |
| 5,857,338 | * 1/1999 | Rigal | 60/641.2 X |

OTHER PUBLICATIONS

Wiliam Hamilton, Electric Automobiles, General Research Corporation, pp. 163–251, Dec. 29, 1980.*

* cited by examiner

*Primary Examiner*—Hoang Nguyen
(74) *Attorney, Agent, or Firm*—Nath & Associates PLLC; Gary M. Nath; Jerald L. Meyer

(57) ABSTRACT

A transportation system is based on battery powered vehicles operating in an isolated geographic area within which a base electrical load during the day exceeds the normal electrical load during the night. The system is operated by generating power for the load by using a geothermal power plant that operates day and night at a substantially constant power output. The vehicles are operated during the day; and power generated by the power plant supplies the base electrical load. Recharging of the batteries of the vehicles occurs only at night when power generated by the power plant in excess of the normal electrical load is available for recharging purposes.

50 Claims, 3 Drawing Sheets

METHOD OF AND APPARATUS FOR USING A GEOTHERMAL POWER PLANT

RELATED APPLICATION

This application is a continuation of application Ser. No. 08/768,272 filed Dec. 18, 1996 (now U.S. Pat. No. 5,740,672 which issued Apr. 21, 1998), which is a continuation of application Ser. No. 08/000,551 filed Jan. 4, 1993 (now abandoned), which is a continuation of application Ser. No. 07/656,879 filed Feb. 19, 1991 (now abandoned).

TECHNICAL FIELD

This invention relates to methods for using a geothermal power.

BACKGROUND OF THE INVENTION

In many parts of the world, isolated land masses exist which require the importation of fossil fuels to generate electrical power. The Hawaiian Islands are an example of such land masses; and power generation is presently limited to conventional fossil-fueled plants using steam or gas turbines which produce undesirable atmospheric pollutants. In an effort to improve the environment, it has been proposed to utilize geothermal sources to produce power. If the geothermal sources are present on certain outlying islands, the power produced can be sent to the main islands, for example, by conventional underwater power transmission lines. Because the normal electrical load in the islands is such that the load during the day or periods of peak power demand greatly exceeds the load at night, or during periods of off-peak power demand, geothermal power plants inherently are not totally suitable. The problem is that a geothermal power plant usually operates at rated capacity all the time, both day and night. Thus, a plant capable of supplying the daytime load would have excess capacity at night. Because of the geographical isolation of the plant, it is not practical to transmit the excess power produced at night to another customer; and for this reason, large scale geothermal power plants are often not appropriate for the conditions described above. Consequently, conventional fossil-fueled power plants are supplemented by fast starting gas turbine power units for daytime peaking because these units can be brought on and off line quickly. Generating electricity using conventional oil-fired plants using steam turbines for base line power production supplemented by gas turbine peaking is both expensive and polluting.

Geothermal power plants are cost effective, but the nature of these plants is not conducive to quickly starting and stopping, which means that the substitution of such plants for conventional fossil-fueled plants is not practical in a geographically isolated location where excess power at night cannot be disposed of. One approach to this problem is to vent the geothermal production wells at night, and reduce the operating level of the plant to accommodate the low level load during the night. This approach is not desirable because geothermal vapors contain noxious gases which, when released to the atmosphere, are dangerous to human health. Treatment systems exist for removing noxious gases, but the cost of this equipment is prohibitive. It is therefore an object of the present invention to utilize a geothermal power plant in a new and different way so as to avoid the problems with the prior art as outlined above.

BRIEF DESCRIPTION OF THE INVENTION

The present invention provides a method for operating a transportation system based on electric powered vehicles, such as battery powered vehicles particularly suitable for use in an isolated geographic area within which the base electrical load during the day, or periods of peak demand, exceeds the normal electrical load during the night, or periods of off-peak power demand. The method includes the steps of generating power for the electrical load wherein a power production system or a geothermal power plant that operates day and night, preferably at substantially constant power output, may be used or included in the power production system. Thus, for example, during the day, the power plant supplies the required electrical load, and the battery powered vehicles are operated without imposing any load on the power plant. This is particularly effective when the geographical area served by the power plant is isolated, and vehicular traffic is essentially tourist travel.

During the night, the batteries of the vehicles are charged utilizing the power generated by the power plant at night in excess of the normal electrical load. Thus, the electrical load supplied, for example, by the geothermal power plant during the day is the usual daytime load, and the electrical load supplied by the geothermal power plant during the night is the normal nighttime load plus the load imposed by recharging the batteries in the vehicles.

Preferably, recharging stations are provided in the geographic area are linked by roads over which the battery powered vehicles travel. Advantageously, the distance between adjacent stations can be selected so as to be substantially equal to the cruising range of a vehicle which means that a vehicle can travel from one station to the next station on a full battery charge. Such travel occurs during the day so that, at night, the vehicle may be recharged at a charging station.

The invention also consists of a transportation system for an isolated geographic area comprising a ring-road defining the geographical area, and a plurality of re-charging stations spaced around the ring-road. An electrical distribution system is provided for supplying power to the recharging stations wherein the electrical distribution system may include a geothermal power plant that preferably produces power at a substantially constant rate.

Thus, the increased electric load during periods of off-peak power demand, such as during the night, will lead to increased use of geothermal power plants, usually increasing the level of power production of such plants thereby reducing the amount of pollutants produced in electric power production. Also, the use of battery operated cars will bring about a reduction in air pollution because the number of fossil fueled cars or vehicles will be reduced.

BRIEF DESCRIPTION OF THE DRAWINGS

Embodiments of the present invention are described below by way of example and with reference to the accompanying drawings wherein.

DETAILED DESCRIPTION

Figure 1:
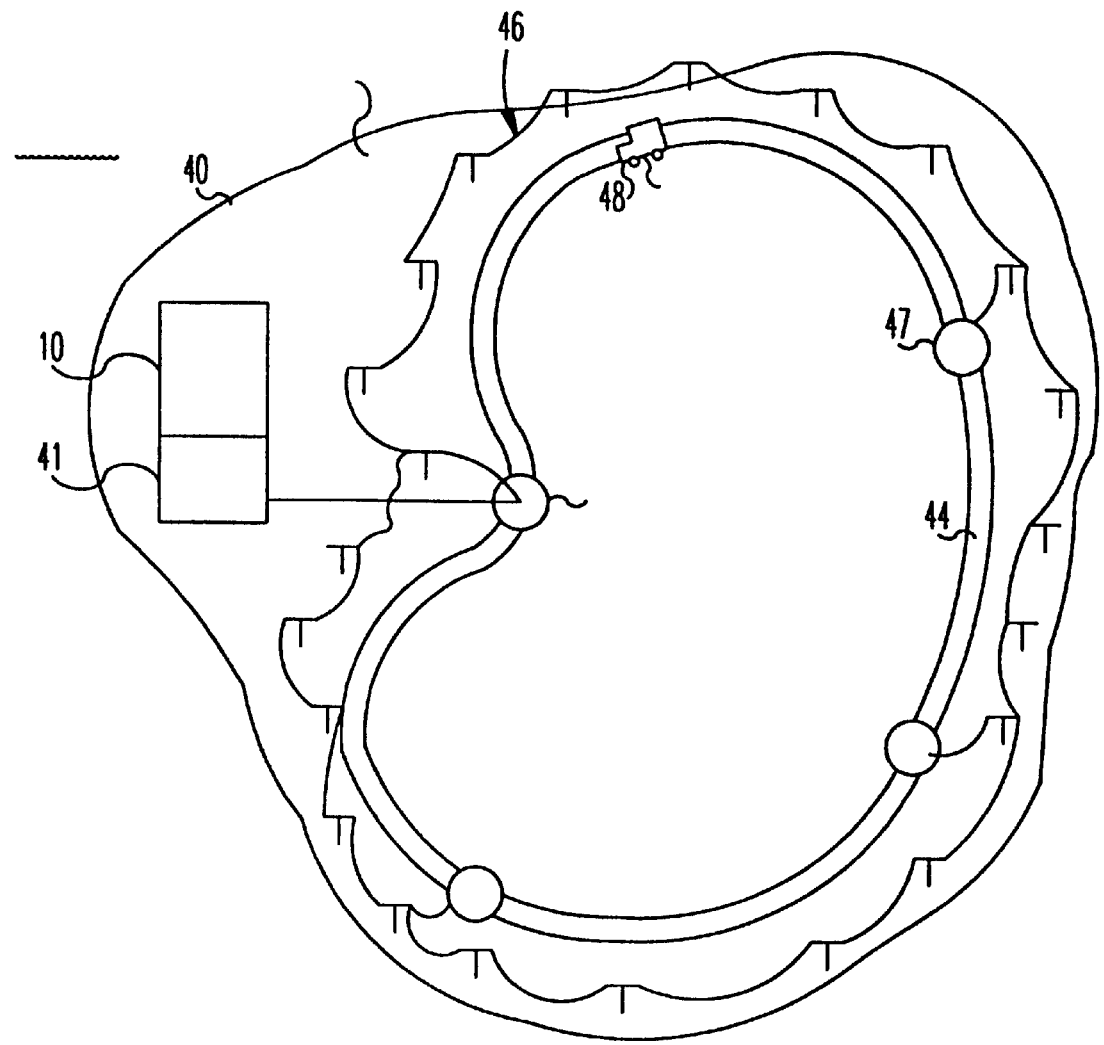
FIG. 1 is a schematic plan of an isolated geographic area comprising an island similar to one of the Hawaiian Islands showing a transportation system including a geothermal power plant in accordance with the present invention.

Referring now to the drawings, FIG. 1 illustrates a transportation system based on battery powered vehicles in an isolated geographic area within which a base electrical load during the day exceeds the normal electrical load during the night. As shown in FIG. 1, island 40 preferably is provided with geothermal power plant 10 and electrical substation 41, or other power plant facilities, providing power to transmission line 46. On island 40 is ring-road 44 which generally follows the shoreline of the island completely therearound. Transmission line 46 which circles the island, generally follows ring-road 44.

Located at several different locations on ring-road 44 are recharging stations 47 which, preferably, are equidistant apart. The distance may be chosen to be compatible with the cruising range of battery powered electrical vehicles 48. Stations 47 tap into transmission line 46. If preferred, a bank of, or several, charged batteries, can be provided or made available at the various stations to enable an operator to exchange a discharged battery from a car with a charged battery.

Figure 2:
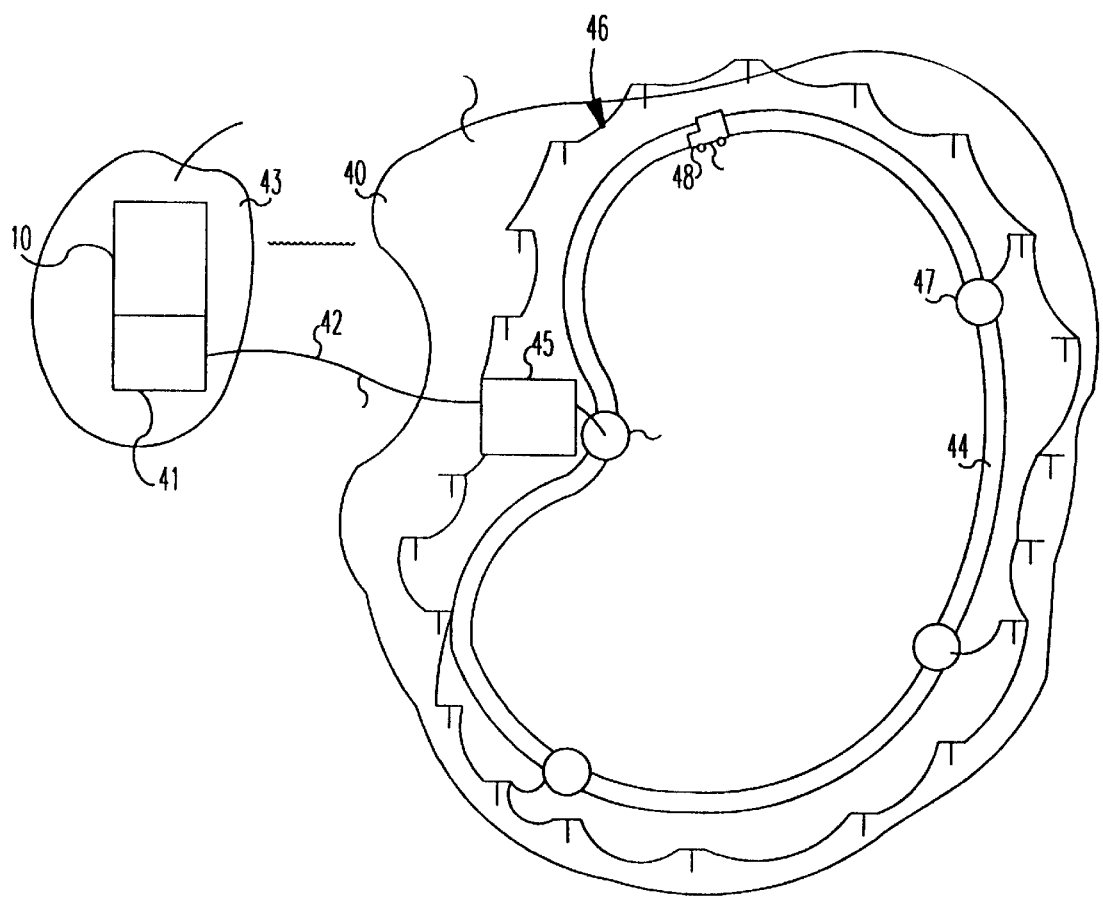
FIG. 2 is a further schematic plan of an isolated geographic area comprising two islands similar to the Hawaiian Islands showing a transportation system in accordance with the present invention.

If the geothermal power plant is located on another island outlying the main island, geothermal power plant 10 together with substation 41 may be located on the outlying island indicated by reference numeral 43 in FIG. 2. As shown in FIG. 2, substation 41 provides power to transmission line 42 connected to main island 40 and terminates at substation 45 which supplies power to land based transmission line 46.

Figure 3:
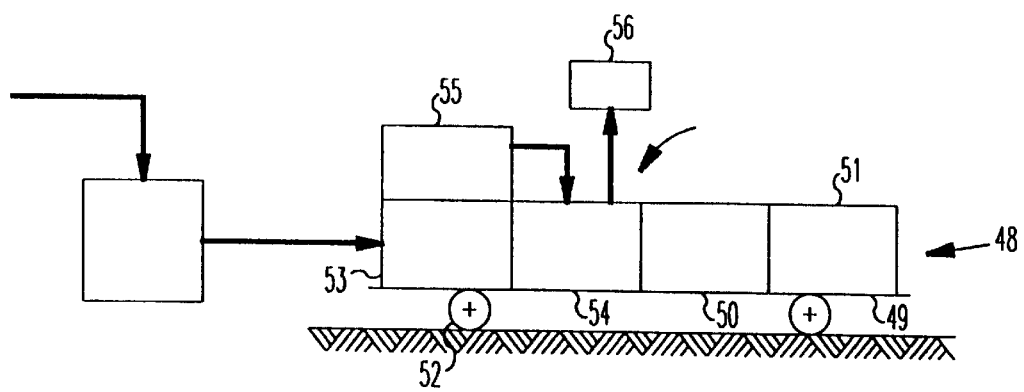
FIG. 3 is a schematic block diagram of a battery operated vehicle showing the manner in which recharging is achieved.
Figure 4:
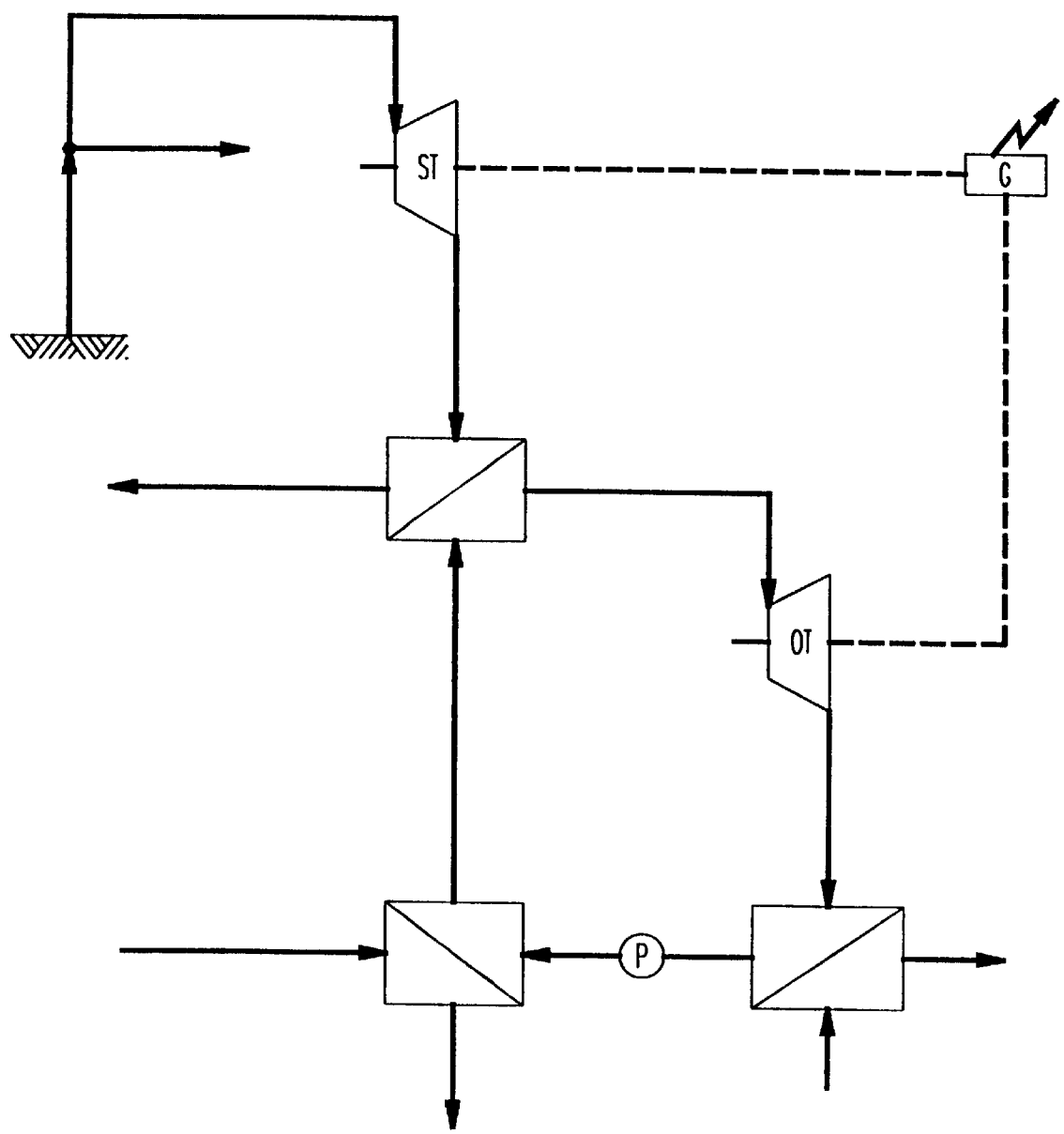
FIG. 4 is a schematic block diagram of a geothermal power plant shown schematically in FIG. 1.

As shown in FIG. 3, each vehicle 48 includes chassis 49 on which are mounted electric motor 50 and transmission 51 for the purpose of driving wheels 52. Also mounted on chassis 49 is storage battery 53 which provides power for motor 50 by way of control means 54 which is operated by a user.

Associated with battery 53 is charge level detector 55 for the purpose of determining the charge level on the storage batteries. Control 54 is responsive to the charge level detector for operating alarm 56 when the charge level falls to a threshold.

Preferably, each car is provided with a communication system, such as a telephone, which can also be used to communicate with the recharging station. Furthermore, advantageously, emergency vehicles may be located at one or more of the various recharging stations for providing service, for example, delivering batteries to a vehicle or to a station as the need may arise.

In operation, vehicles 48 preferably would be made available during the day with a full battery charge at a recharging station. The user could then travel to the next recharging station during the day depleting the charge on the battery. The capacity of the battery and the design of the vehicle is such that the cruising distance and speed are such that transit from one station to the next takes a reasonable time, say no more than 4 hours. Alternatively, the vehicles could be used in the vicinity of a charging station, and returned there at night for recharging. This arrangement is particularly well suited to car rentals.

The resultant increased electric load during periods of off peak power demand, such as during the night, in order to charge batteries, will lead to increased use of geothermal power plants, usually by increasing the level of power production from such plants. This will reduce the amount of power produced by conventional fossil-fueled power plants leading to a reduction in pollutants by such plants. In addition, the use of battery operated vehicles will further reduce air pollution as a result in a reduction in the number of fossil fueled vehicles used.

Even though the above description refers to a geothermal power plant indicated by reference numeral 10 in FIGS. 1 and 2, as preferably producing substantially constant power continuously during the day and the night, the present invention also contemplates the use of a modular geothermal power plant where, if necessary, one or more modular units can be used to produce power. Such a geothermal power plant is described in U.S. patent application Ser. No. 444,565 filed Dec. 1, 1989 (now U.S. Pat. No. 5,497,624 issued Mar. 12, 1996), the disclosure of which is hereby incorporated by reference. The '624 patent discloses a power plant module for producing electric power from a source of geothermal fluid that produces steam containing non-condensable gases and brine. The module includes a steam turbine operating on steam from the source of geothermal fluid for producing power and heat depleted steam, a steam condenser for receiving the heat depleted steam, and means for indirectly cooling the steam condenser with liquid organic fluid thereby producing vaporized organic fluid and steam condensate. The power plant also includes an organic vapor turbine operating on the vaporized organic fluid for producing power and heat depleted organic vapor, an organic fluid condenser for condensing the heat depleted organic vapor into liquid organic fluid, and a pump for returning the organic liquid to the steam condenser. Finally, the power plant also includes a preheater for preheating the organic liquid, before it is supplied to the steam condenser, with heat present in the geothermal fluid and contained in fluid or brine derived from the geothermal fluid. The utilization of such a power plant increases its flexibility by permitting a reduction of power by removing one or more modules from the line. This is particularly advantageous during maintenance periods. Even in such a modular geothermal power plant, its use will lead to a reduction in air pollution.

The advantages and improved results furnished by the method and apparatus of the present invention are apparent from the foregoing description of the preferred embodiment of the invention. Various changes and modifications may be made without departing from the spirit and scope of the invention as described in the appended claims.

What is claimed is:

1. A system for an isolated geographic area such as an island having a source of geothermal fluid that produces steam containing non-condensable gases, and brine, said system comprising:
   a) a plurality of battery operated vehicles for traversing said area, each vehicle being provided with a battery, a charge level detector for determining the charge level on said battery, an alarm, and control means for operating the alarm when the charge level on said battery falls to a threshold;
   b) a plurality of charging stations located in said area for recharging the batteries of said vehicles;
   c) an electrical grid for distributing power to said geographical area which requires more power during the day than at night; and
   d) a geothermal power plant for supplying power to said grid at a substantially constant power level day and night, said power plant including at least one module comprising:
      (1) a steam turbine operating on steam from the source of geothermal fluid for producing power and heat depleted steam;

(2) a steam condenser for receiving the heat depleted steam;
(3) means for indirectly cooling the steam condenser with liquid organic fluid thereby producing vaporized organic fluid and steam condensate;
(4) an organic vapor turbine operating on the vaporized organic fluid for producing power and heat depleted organic vapor;
(5) an organic fluid condenser for condensing the heat depleted organic vapor into liquid organic fluid;
(6) means for returning said organic liquid to the steam condenser; and
(7) a preheater for preheating the organic liquid, before it is supplied to said steam condenser, with heat contained in the geothermal fluid.

2. A system according to claim 1 wherein said geographic area is an island.

3. A system according to claim 1 including means for supplying said brine to said preheater for producing cooled brine.

4. A system according to claim 1 wherein said organic fluid is pentane.

5. A system according to claim 1 wherein a single electric generator is interposed between and individually driven by the steam turbine and the organic vapor turbine.

6. A system according to claim 1 including means for supplying said steam condensate to a re-injection well.

7. A system according to claim 1 wherein non-condensable gases collect in said steam condenser, and including means for compressing said non-condensable gases, and means for supplying the compressed non-condensable gases to a re-injection well.

8. A system according to claim 7 including means for supplying said steam condensate to said re-injection well.

9. A system according to claim 7 including means for adding brine to said steam condensate prior to combining the compressed non-condensable gases with the steam condensate.

10. A system according to claim 9 including means for supplying steam condensate, brine and compressed non-condensable gases to the same re-injection well.

11. A system according to claim 3 including means for supplying said cooled brine to a re-injection well; and means for compressing non-condensable gases which collect in said steam condenser, and means for supplying the compressed non-condensable gases to a re-injection well.

12. A system according to claim 1 including means for supplying liquid derived from said geothermal fluid to said preheater for supplying heat contained in said geothermal fluid.

13. A system according to claim 12 wherein said liquid derived from said geothermal fluid is said brine.

14. A system according to claim 12 wherein said power plant is located on a separate island.

15. A system for an isolated geographic area such as an island, said system comprising:
a) a plurality of battery operated vehicles for traversing said area, each vehicle being provided with a battery, a charge level detector for determining the charge level on said battery, an alarm, and control means for operating the alarm when the charge level on said battery falls to a threshold;
b) a plurality of charging stations located in said area for recharging the batteries of said vehicles;
c) an electrical grid for distributing power to said geographical area which requires more power during the day than at night; and
d) a geothermal power plant operating from a source of geothermal fluid for supplying power to said grid at a substantially constant power level day and night, said power plant including at least one module comprising:
(1) a heat exchanger for indirectly cooling fluid derived from said geothermal fluid with liquid organic fluid thereby producing vaporized organic fluid and cooled fluid;
(2) an organic vapor turbine operating on the vaporized organic fluid for producing power and heat depleted organic vapor;
(3) an organic fluid condenser for condensing the heat depleted organic vapor into liquid organic fluid;
(4) means for returning said organic liquid to the heat exchanger; and
(5) a preheater for preheating the organic liquid, before it is supplied to said heat exchanger, with heat contained in the geothermal fluid.

16. A system according to claim 15 wherein said geographic area is an island.

17. A system according to claim 15, wherein said geothermal fluid produces brine which is supplied to said preheater for preheating the organic liquid with heat contained in the geothermal fluid before the organic fluid is supplied to said heat exchanger and producing cooled brine.

18. A system according to claim 15 wherein said organic fluid is pentane.

19. A system according to claim 17 including means for supplying said cooled brine to a re-injection well.

20. A system according to claim 15 including a steam turbine operating on steam from said source of geothermal fluid, and wherein said fluid derived from said geothermal fluid comprises steam condensate exiting said steam turbine.

21. A system according to claim 15 wherein said power plant is located in a further isolated geographic area separate from said geographic area.

22. A system for an isolated geographic area such as an island, said system comprising:
a) a plurality of vehicles for traversing said area, each vehicle being provided with an electrically operated motor;
b) an electrical grid for distributing power to said geographical area which requires more power during the day than at night; and
c) a geothermal power plant operating from a source of geothermal fluid for supplying power to said grid at a substantially constant power level day and night, said power plant including at least one module comprising:
(1) a heat exchanger for indirectly cooling fluid derived from said geothermal fluid with liquid organic fluid thereby producing vaporized organic fluid and cooled fluid;
(2) an organic vapor turbine operating on the vaporized organic fluid for producing power and heat depleted organic vapor;
(3) an organic fluid condenser for condensing the heat depleted organic vapor into liquid organic fluid;
(4) means for returning said organic liquid to the heat exchanger; and
(5) a preheater for preheating the organic liquid, before it is supplied to said heat exchanger, with heat contained in the geothermal fluid.

23. A system according to claim 22 wherein said geographic area is an island.

24. A system according to claim 22 wherein said geothermal fluid produces brine which is supplied to said preheater for preheating the organic liquid with heat contained in the geothermal fluid before the organic fluid is supplied to said heat exchanger and producing cooled brine.

25. A system according to claim 22 wherein said organic fluid is pentane.

26. A system according to claim 24 including means for supplying said cooled brine to a re-injection well.

27. A system according to claim 22 including a steam turbine operating on steam from said source of geothermal fluid, and wherein said fluid derived from said geothermal fluid comprises low pressure steam exiting said steam turbine.

28. A system according to claim 22 wherein said power plant is located in an isolated geographic area separate from said geographic area.

29. A system according to claim 22 wherein said plurality of vehicles provided with an electrically operated motor comprises a plurality of vehicles including motors having a battery.

30. A system according to claim 29 wherein said plurality of vehicles including a motor having a battery comprises a plurality of vehicles each of which is provided with a battery, a charge level detector for determining charge level on the battery, an indicator, and control means for operating the indicator when the charge level on the battery falls to a threshold.

31. A system according to claim 30 wherein said plurality of vehicles including a motor having a battery comprises a plurality of vehicles, each having a battery operated motor.

32. A system according to claim 30 including a plurality of charging stations located in said area for recharging the batteries of said vehicles.

33. A method for operating a transportation system for an isolated geographic area such as an island comprising:
   a) providing a plurality of battery operated vehicles for traversing said area, each vehicle being provided with a battery, a charge level detector for determining the charge level on said battery, an alarm, and control means for operating the alarm when the charge level on said battery falls to a threshold;
   b) providing a plurality of charging stations located in said area for recharging the batteries of said vehicles;
   c) providing an electrical grid for distributing power to said geographical area which requires more power during the day than at night; and
   d) providing a geothermal power plant operating from a source of geothermal fluid for supplying power to said grid at a substantially constant power level day and night, said power plant including at least one module comprising:
      (1) a heat exchanger for indirectly cooling fluid derived from said geothermal fluid with liquid organic fluid thereby producing vaporized organic fluid and cooled fluid;
      (2) an organic vapor turbine operating on the vaporized organic fluid for producing power and heat depleted organic vapor;
      (3) an organic fluid condenser for condensing the heat depleted organic vapor into liquid organic fluid;
      (4) means for returning said organic liquid to the heat exchanger; and
      (5) a preheater for preheating the organic liquid, before it is supplied to said heat exchanger, with heat contained in the geothermal fluid.

34. A method according to claim 33 including operating the transportation system for an isolated geographic region on an island.

35. A method according to claim 33 including producing brine from said geothermal fluid and supplying said brine to said preheater for preheating the organic liquid with heat contained in the geothermal fluid before the organic fluid is supplied to said heat exchanger and producing cooled brine.

36. A method according to claim 33 wherein the step of providing a geothermal power plant operating from a source of geothermal fluid including at east one module is carried out by providing at least one module operating on pentane.

37. A method according to claim 35 including supplying said cooled brine to a re-injection well.

38. A method according to claim 33 including providing a steam turbine operating on steam from said source of geothermal fluid, and wherein said fluid derived from said geothermal fluid comprises low pressure steam exiting said steam turbine.

39. A method according to claim 33 including locating said power plant in a further isolated geographic area separate from said geographic area.

40. A method for operating a transportation system for an isolated geographic area such as an island, comprising:
   a) providing a plurality of vehicles for traversing said area, each vehicle being provided with an electrically operated motor;
   b) providing an electrical grid for distributing power to said geographical area which requires more power during the day than at night; and
   c) providing a geothermal power plant operating from a source of geothermal fluid for supplying power to said grid at a substantially constant power level day and night, said power plant including at least one module comprising:
      (1) a heat exchanger for indirectly cooling fluid derived from said geothermal fluid with liquid organic fluid thereby producing vaporized organic fluid and cooled fluid;
      (2) an organic vapor turbine operating on the vaporized organic fluid for producing power and heat depleted organic vapor;
      (3) an organic fluid condenser for condensing the heat depleted organic vapor into liquid organic fluid;
      (4) means for returning said organic liquid to the heat exchanger; and
      (5) a preheater for preheating the organic liquid, before it is supplied to said heat exchanger, with heat contained in the geothermal fluid.

41. A method according to claim 40 including operating the transportation system for an isolated geographic area on an island.

42. A method according to claim 40 including producing brine from said geothermal fluid and supplying said brine to said preheater for preheating the organic liquid with heat contained in the geothermal fluid before the organic fluid is supplied to said heat exchanger and producing cooled brine.

43. A method according to claim 40 wherein the step of providing a geothermal power plant operating from a source of geothermal fluid including at least one module is carried out by providing at least one module operating on pentane.

44. A method according to claim 42 including supplying said cooled brine to a re-injection well.

45. A method according to claim 40 including providing a steam turbine operating on steam from said source of geothermal fluid, and wherein said fluid derived from said geothermal fluid comprises low pressure steam exiting said steam turbine.

46. A method according to claim 40 including locating said power plant in an isolated geographic area separate from said geographic area.

47. A system according to claim 40 wherein the step of providing said plurality of vehicles provided with an electrically operated motor is carried out by providing a plurality of vehicles including motors having a battery.

48. A method according to claim 47 wherein the step of providing said plurality of vehicles including a motor having a battery is carried out by providing a plurality of vehicles each of which is provided with a battery, a charge level detector for determining charge level on the battery, an indicator, and control means for operating the indicator when the charge level on the battery falls to a threshold.

49. A method according to claim 48, wherein the step of providing said plurality of vehicles including a motor having a battery is carried out by providing a plurality of vehicles, each vehicle having a battery operated motor.

50. A method according to claim 48 including providing a plurality of charging stations located in said area for recharging the batteries of said vehicles.

* * * * *